(12) United States Patent
Diab (10) Patent No.: US 8,806,064 B2
(45) Date of Patent: Aug. 12, 2014

(54) VIRTUAL INTERFACE TO THE POE DEVICE THROUGH AN EXPANDED REGISTERED MAP IN A NETWORKING DEVICE SUCH AS A PHY

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1076 days.

(21) Appl. No.: 11/529,362

(22) Filed: Sep. 29, 2006

(65) Prior Publication Data

US 2008/0082695 A1   Apr. 3, 2008

(51) Int. Cl.
| G06F 15/16 | (2006.01) |
| G06F 1/00 | (2006.01) |
| H04L 12/66 | (2006.01) |
| H04L 29/06 | (2006.01) |
| G06F 1/26 | (2006.01) |

(52) U.S. Cl.
CPC *H04L 29/06* (2013.01); *G06F 1/26* (2013.01); *G06F 1/266* (2013.01)
USPC ........... 709/250; 713/300; 713/310; 370/463; 307/126

(58) Field of Classification Search
USPC ............... 709/250; 713/300–340; 307/1, 307/125–131; 712/32, 225, 228, 31; 370/463
See application file for complete search history.

(56) References Cited

U.S. PATENT DOCUMENTS

| 5,530,908 | A | * | 6/1996 | Rozenstrauch et al. | 455/8 |
| 5,555,438 | A | * | 9/1996 | Blech et al. | 710/30 |
| 5,983,338 | A | * | 11/1999 | Moyer et al. | 712/34 |
| 6,021,499 | A | * | 2/2000 | Aleshi | 713/300 |
| 6,058,467 | A | * | 5/2000 | Broxterman et al. | 712/32 |
| 6,529,519 | B1 | * | 3/2003 | Steiner et al. | 370/412 |
| 7,325,749 | B1 | * | 2/2008 | Alexander et al. | 236/78 A |
| 7,327,754 | B2 | * | 2/2008 | Mills et al. | 370/463 |
| 7,340,620 | B2 | * | 3/2008 | Dove | 713/300 |
| 7,477,410 | B1 | * | 1/2009 | Klein | 358/1.15 |
| 7,624,157 | B2 | * | 11/2009 | David et al. | 709/215 |
| 7,801,121 | B1 | * | 9/2010 | Van Wageningen et al. | 370/386 |
| 7,809,960 | B2 | * | 10/2010 | Cicchetti et al. | 713/300 |
| 7,966,613 | B2 | * | 6/2011 | Zur et al. | 718/1 |
| 8,397,093 | B2 | * | 3/2013 | Diab et al. | 713/340 |
| 2002/0152355 | A1 | * | 10/2002 | Otterness et al. | 711/114 |
| 2004/0049609 | A1 | * | 3/2004 | Simonson et al. | 710/8 |
| 2004/0164619 | A1 | * | 8/2004 | Parker et al. | 307/80 |
| 2004/0230846 | A1 | * | 11/2004 | Mancey et al. | 713/300 |
| 2005/0141539 | A1 | * | 6/2005 | Hamilton et al. | 370/432 |
| 2005/0178001 | A1 | * | 8/2005 | Quinlan et al. | 29/832 |
| 2005/0288828 | A1 | * | 12/2005 | Claseman | 701/1 |
| 2006/0007614 | A1 | * | 1/2006 | Pozzuoli et al. | 361/62 |
| 2006/0078093 | A1 | * | 4/2006 | Karam et al. | 379/24 |
| 2006/0212838 | A1 | * | 9/2006 | Carson et al. | 716/17 |
| 2006/0239183 | A1 | * | 10/2006 | Robitaille et al. | 370/217 |
| 2006/0259792 | A1 | * | 11/2006 | Dove | 713/300 |
| 2007/0019445 | A1 | * | 1/2007 | Blaha et al. | 363/21.12 |

(Continued)

*Primary Examiner* — Catherine Thiaw (74) *Attorney, Agent, or Firm* — Sterne, Kessler, Goldstein & Fox P.L.L.C.

(57) ABSTRACT

Provided is a Power over Ethernet (PoE) device. The PoE device includes a physical layer device (PHY) including a first number of registers PHY and a power sourcing equipment (PSE) device. The PSE device (i) includes a second number of registers and (ii) is electrically coupled to the PHY. The contents of one of the first and second number of registers is an extension of the other of the first and second number of registers.

13 Claims, 7 Drawing Sheets

(56) References Cited

U.S. PATENT DOCUMENTS

| | | |
|---|---|---|
| 2007/0030613 A1* | 2/2007 | Sousa et al. .................... 361/92 |
| 2007/0074052 A1* | 3/2007 | Hemmah et al. ............. 713/300 |
| 2007/0208961 A1* | 9/2007 | Ghoshal et al. .............. 713/300 |
| 2007/0223520 A1* | 9/2007 | Diab ............................ 370/463 |
| 2007/0260904 A1* | 11/2007 | Camagna et al. ............. 713/310 |
| 2007/0277049 A1* | 11/2007 | Hansalia ...................... 713/321 |
| 2007/0294583 A1* | 12/2007 | Traskov et al. ................ 714/37 |
| 2008/0058149 A1* | 3/2008 | Yang ............................ 475/230 |
| 2010/0005320 A1* | 1/2010 | Squillante .................... 713/300 |

* cited by examiner

VIRTUAL INTERFACE TO THE POE DEVICE THROUGH AN EXPANDED REGISTERED MAP IN A NETWORKING DEVICE SUCH AS A PHY

BACKGROUND OF THE INVENTION

1. Field of the Invention

The present invention generally relates to Power over Ethernet (PoE) devices, and more specifically to a virtual interface to the PoE device through other networking elements such as a physical layer device (PHY) or a switch.

2. Related Art

Ethernet communications provide high speed data communications over a communications link between two communications nodes that operates according the IEEE 802 Ethernet Standard. The communications medium between the two nodes can be twisted pair wires for Ethernet, or other types communications medium that are appropriate. PoE communication systems provide power and data communications over a common communications link. More specifically, a power source device (PSE) connected to the physical layer of the first node of the communications link provides direct current (DC) power (for example, 48 volts DC) to a powered device (PD) at the second node of the communications link. The DC power is transmitted simultaneously over the same communications medium with the high speed data from one node to the other node.

Example PD devices that utilize PoE include Internet Protocol (IP) phones, wireless access points, etc. The PSE device is often a data switch having at least two rows of data ports, where a data port in the input row of data ports can be switched to any one of the data ports in the output row of data ports. Each data port typically includes a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion.

On the PSE chip portion of the PoE device, the DC voltage supply circuit provides a voltage, e.g., 48 volts, to power the PD. The DC voltage supply and its corresponding output voltage, are controlled by the PSE controller. For example, the PSE controller includes a switch connected across output terminals of the DC voltage supply circuit for determining when its output voltage is switched on or off. The PSE chip also performs functions such as discovering a presence of PD devices by checking for characteristic resistances, managing/integrating power, and monitoring current draw.

An important aspect of the PoE device is its management system which has to interface with all the subsystems in the device including the PSE subsystem that includes the PSE controller chip as well as the data subsystem that may include but is not limited to a PHY chip, Switch chip or both. The management system is often referred to as the system host. Often this host is a local central processor unit (CPU) or simple microcontroller that may run some sort of firmware or software. In some cases, the CPU, PHY and switch may be embedded in one chip while in other larger systems that may be physically located on separate printed circuit boards (PCBs).

In the past, significant resources have been directed to the interface between the system host and the PHY chip and/or the switch chip. Also, significant resources may be required to add a PSE sub-system to a data only design to enable the host to communicate with the PSE controller. This is a cumbersome process. The invention here allows for minimal resources and effort to be applied as the interface to the host for the PSE subsystem can be presented as an extension of the switch or PHY subsystem through virtual registers that reflect those present in the PSE chip but abstract the host from their physical location.

A part of the interface between the PHY and the PoE chip is an isolation boundary. A DC isolation boundary is typically formed between the PHY and the PSE controller to limit any effects of DC feedback associated with the DC voltage supply circuit. One of the most common ways of transferring signals across the isolation boundary is to use opto-isolators or opto-coupling devices. Opto-isolators, for example, can be placed along the feedback path between the PSE controller and the PHY. As understood by those of skill in the art, opto-isolators are made up of a light emitting device, and a light sensitive device, wrapped in a single package, but having no electrical connection between the two. A beam of light facilitates transmission of the signals across the isolation boundary. The light emitter is nearly always an LED.

Implementing virtual registers/interface in the PHY or Switch does not eliminate the need to cross the isolation boundary. However, this implementation abstracts the system host from the physicality of this boundary.

What is also needed is a technique to more efficiently program registers within the PHY and the PSE controller. More specifically, what is needed is a method or system that will eliminate the need to separately maintain register sets within the PHY and within the PSE controller.

BRIEF SUMMARY OF THE INVENTION

In one embodiment, the present invention includes a power over Ethernet (PoE) device. The PoE device includes a physical layer device (PHY) including a first number of registers PHY and a power sourcing equipment (PSE) device. The PSE device (i) includes a second number of registers and (ii) is electrically coupled to the PHY. The contents of one of the first and second number of registers is an extension of the other of the first and second number of registers.

The present invention provides a virtual interface to the PoE device through an expanded register map in a networking device such as a PHY. In the present invention, the physical interface between the PHY and the PoE, or switch and PoE, is abstracted from the software host. It may be synchronous or asynchronous. It may be Open Systems Interconnection (OSI) layer 2 or layer 3, but the software host is unaware of its presence. That is, the software host can only see the expanded register set in the switch and/or Phy for PoE functionality.

More particularly, the present invention expands the software drivers required in PHY devises so as to control and provide an interface to the PoE chip. In the present invention, an expanded register map can be implemented in the PHY, where registers are added for general PoE control functions. The existing software drivers do not need to know that the PoE is not part of the PHY so that the PHY can provided a virtual path from the software driver to the PoE.

Additionally, the present invention provides a unique technique for programming registers within the PHY, or switch, and registers within the PSE controllers. In the present invention, software developed for operation of the PSE controllers and configured for storage within PSE controller registers can be virtually copied into the PHY without the need for separate programming of each register set.

In another embodiment of the present invention, the PHY can be integrated with, or part of, the switch chip itself. In this configuration, a variation of the PSE registers can be virtually copied, or mirrored, directly into the switch chip. A similar configuration can be arranged for the PD controller. That is, a virtual register set can be created with the PHY and/or switch chip associated with the PD.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appending claims.

It will be apparent to one skilled in the art that the present invention, as described below, may be implemented in many different embodiments. Any actual software code implementing the present invention is not limiting of the present invention. Thus, the operational behavior of the present invention will be described with the understanding that modifications and variations of the embodiments are possible, given the level of detail presented herein.

Figure 1:
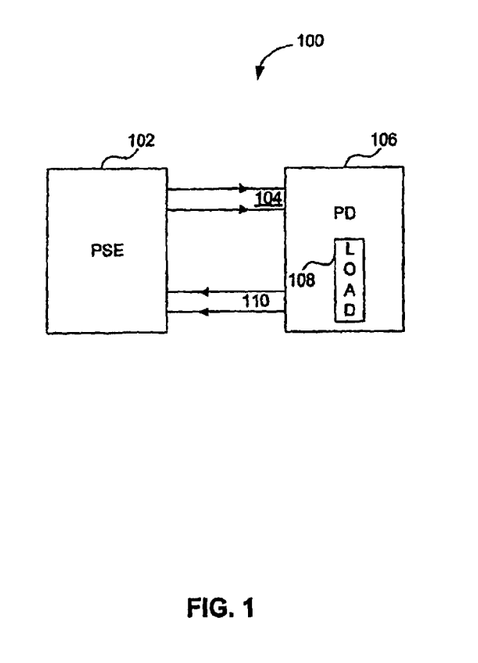
FIG. 1 is a block diagram of a conventional Power over Ethernet (PoE) system.

FIG. 1 illustrates a high level diagram of a conventional Power over Ethernet (PoE) system 100 that provides both DC power and data communications over a common data communications medium. Referring to FIG. 1, power source equipment 102 provides DC power over conductors 104, 110 to a powered device (PD) 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
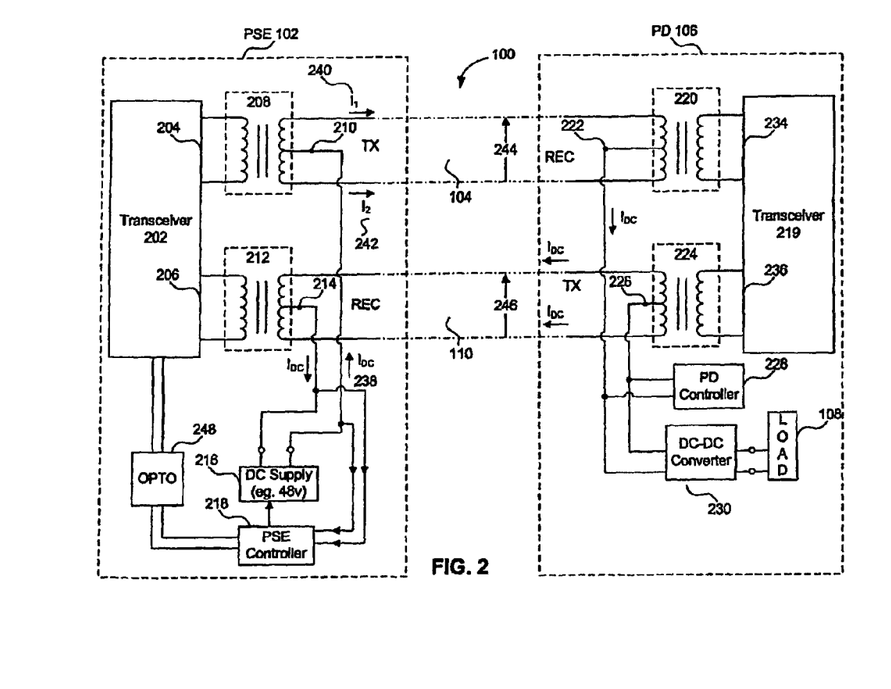
FIG. 2 illustrates a more detailed figure of the conventional power transfer from the Power Source Equipment (PSE) to the Powered Device (PD) in a conventional PoE communications system.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the PHY 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the PHY 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216.

As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not effected by the DC power transfer. An opto-isolator 248, discussed in greater detail below, provides transmission of signals across a DC voltage isolation boundary between the PSE controller 218 and the PHY 202.

As discussed above, in one example, the PSE 102 is a data switch that that is communicating data traffic with one or more PD devices, such as Internet phones, or a wireless access point. The data switch has an input row of data ports and an output row of data ports, where any one of the input data ports can to be switched to any one of the output data ports. Each data port typically includes a serial-to-parallel (i.e. SERDES) transceiver so that data can be received and transmitted using high speed serial techniques, but are processed in parallel on chip.

Figure 3:
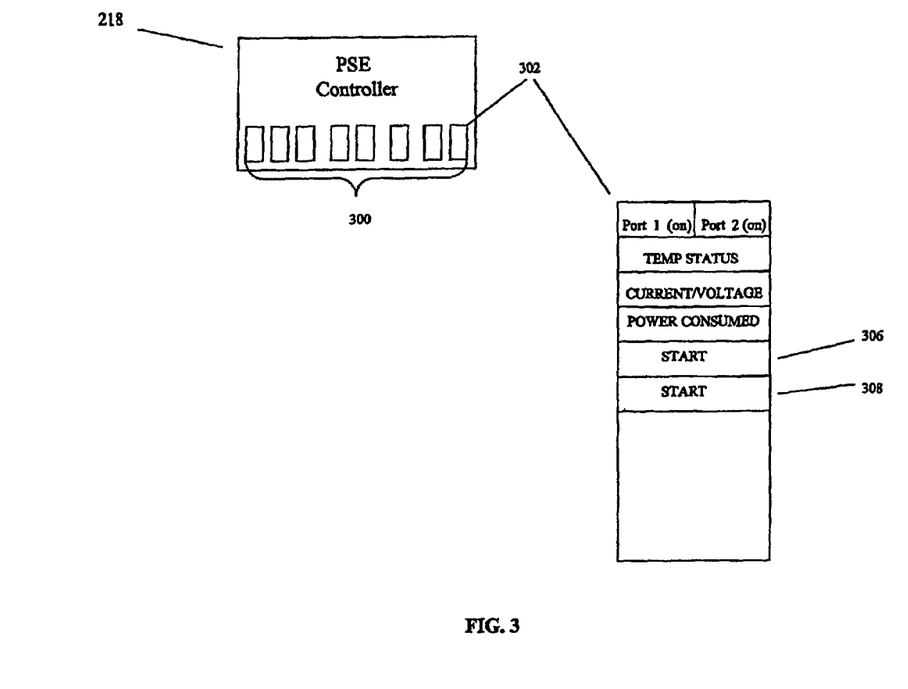
FIG. 3 is a more detailed block diagram illustration of the PSE controller of FIG. 2.

FIG. 3 is a more detailed block diagram illustration 300 of the PSE controller 218 of FIG. 2. As a preliminary matter, communication between the PSE controller 218 and the PHY 202 can occur by way of message transfer between the PSE controller 218 and the PHY 202. Communication can also occur through use of registers within the PSE controller 218, the PHY 202, or both. Because storage registers are an inherent part of the structure of PSE devices and PHYs, register based communication (vice message based) can provide a more efficient communications mechanism.

As illustrated in FIG. 3, the PSE controller 218 includes numerous sets of registers, such as registers 300. By way of example, a single register 302 within the registers 300 might be used within the PSE controller 218 to enable specific ports of the PSE device 102. Locations within the register 302, for example, can be used to control the on/off status of ports 1 and 2, to determine temperature status, monitor current/voltage, monitor power consumed, activate start classification 306, and perform start detection 308, etc. The present invention, however, is not limited to specific uses or functions of specific registers. In other words, additional functions are within the scope and spirit of the present invention.

The PHY 202 also includes a plurality of registers that are used for a variety of functions, to include medium dependent interface crossover (MDIX) features, as well as numerous other functions. By way of comparison, the number of registers in the PHY 202 is significantly higher than the number registers within the PSE controller 218. Thus, a PHY will typically include many more registers than PSE controller will include. The MDIX interface can be used to program the PHY 202.

By way of example, when PHY software drivers are initially programmed, careful consideration is required to closely correlate operational features of the PHY with PoE, and other functions, stored within the PHY registers. An added level of complexity occurs when PHY software programmers, after programming the PHY, must then separately program registers within the PSE controllers. The programming of registers within the PSE controllers must be correlated with functions programmed within the PHY registers to provide seamless functionality between the PHY and the PSE controller. This process can be further complicated based upon the manner in which PSE controllers are physically connected and how information is transferred across the isolation boundary.

The present invention provides a technique that substantially reduces many of the foregoing complications associated with programming the PHY and PSE controller registers. In the present invention, the PSE 102 is configured such that registers within the PHY 202 hold a mirror of contents of the registers 300 within the PSE controller 218. Thus, for a programmer writing a software driver for the PHY 202, functionality within the PSE controller 218 is simply an extension of the functionality previously written for and stored within the registers of the PHY 202.

Figure 4A:
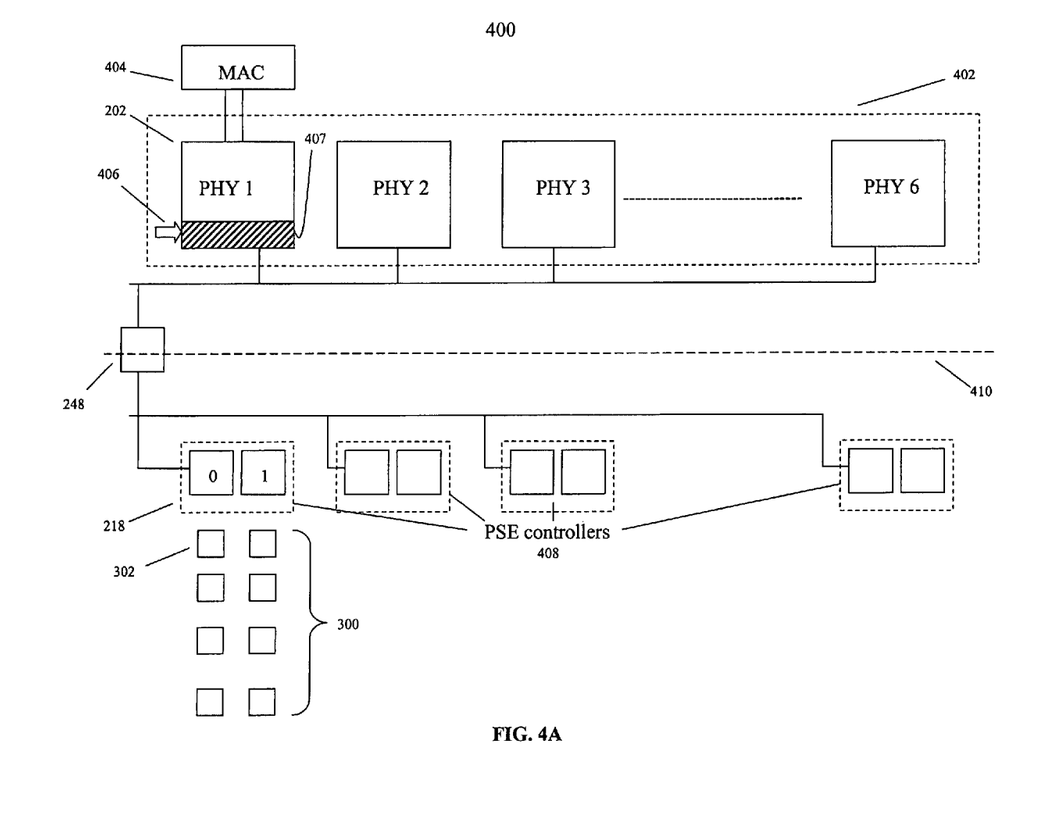
FIG. 4A is a more detailed block diagram illustration of aspects of the PoE system shown in FIG. 1.

FIG. 4A is a more detailed block diagram illustration 400 of aspects of the PoE system 100 shown in FIG. 1. In FIG. 4A, the PHY 202 is one segment of a 6×8 configuration of quad PHY line cards combing to form a PHY board 402. PHY line cards are available in a number of different geometric arrangements, but are generally implemented in accordance with face plate constraints of the corresponding PoE configuration. The 6×8 quad arrangement shown in FIG. 4A provides a total of 48 PHY ports. The present invention, however, is not limited to any particular PHY configuration.

The PHY board 402 is coupled to a medium access control (MAC) block 404 via an X-type media independent interface (xMII). As understood by those of skill in the art, the interface can be implemented as a giga-bit (GMII), serial MII (SMII), a serial giga-bit MII (SGMII), or a reduced MII (RMII), or similar, interface. The PHY 202 also includes a management input/output (MDIO) interface 406 to provide access to a group of PHY registers 407 within the PHY 202.

In the illustration 400 of FIG. 4A, the PHY board 402 is coupled to a group of PSE controllers 408 across an isolation boundary 410. The opto-isolator 248 accommodates transmission of signals across the isolation boundary. Transmission characteristics of the opto-isolator 248, along with shielding properties of the isolation boundary 410, cooperate to enable the PSE 102 to meet or exceed specified electromagnetic interference (EMI) requirements.

Each controller within the group of PSE controllers 408 corresponds to one of the PHYs in the PHY board 402. By way of example, the PSE controller 218, discussed above, is also included within the group of PSE controllers 408.

In the illustration 400, the opto-isolator 248 is coupled to each of the PHYs within the PHY board 402. Each of the PSE controllers within the group of controllers 408 is configured as a quad-port device. Thus, the addresses of the first 8 ports can be identified using two bits.

In FIG. 4A, all of the PSE controllers 408 and the PHYs within the PHY board 402 are connected to the single opto-isolator 248 via a high speed interface. However, numerous other connection configurations involving the PSE controllers, the PHYs, and the opto-isolator(s) are possible. For example, the illustration 400 could depict a configuration including a single opto-isolator for each PHY/PSE pair (i.e., slice). In the present invention, however, regardless of the manner in which the PHYs and PSE controllers are connected across the isolation boundary, from the software programmer's perspective, the registers within the PHYs can be mirrored or replicated within the corresponding PSE controller to drastically simplify PoE programming.

More specifically, in conventional PoE systems, software drivers must first be created for the PHYs. Then, effort and resources must similarly be expended for creation of the drivers for the corresponding PSE controllers.

To remedy this requirement of this dual programming, the present invention capitalizes on the complexity built into the PHY chips. That is, in the present invention, it is recognized that there is relatively low overhead to create additional registers within the PHY to incorporate the software programming required to drive the corresponding PSE controller.

Using the technique of the present invention, as the registers within the PHY are programmed or mapped, the requirement to then separately program or map registers within the PSE controller is eliminated. The elimination occurs because the functionality necessary to drive the PSE controllers is programmed into the PHY registers apriorily. The content of the registers within the PSE controllers is then programmed or mapped as a duplicate or extension of the content of its corresponding PHY. Stated another way, the PHY registers 407 are extended to includes mirror images of the PSE registers 300. The PSE controller registers 300 are mirrored and updated via a hardware interface and protocol that crosses the isolation boundary using an element such as the opto-isolator 248. In this manner, when the software programmer has completed the mapping of the PHY registers, mapping of the corresponding PSE controller register is also simultaneously completed.

When the mapping of the contents of the PHY registers is completed, special hardware, well known to those of skill in the art, can be used to attach the PHY to its corresponding PSE. At this point, the contents of the PHY registers are mirrored into the PSE controller registers. This hardware enables the software programmer to read and write information through the PHY register into the PSE controller register in a single programming step. This single programming step reduces the complexities traditionally required for programming both the PHY registers and the PSE controller registers, ultimately reducing costs and programming time. It also eliminates the requirement for the software to be aware of additional hardware present and the isolation boundary. It simply sees the PoE functionality as an extended or new type of PHY.

Figure 4B:
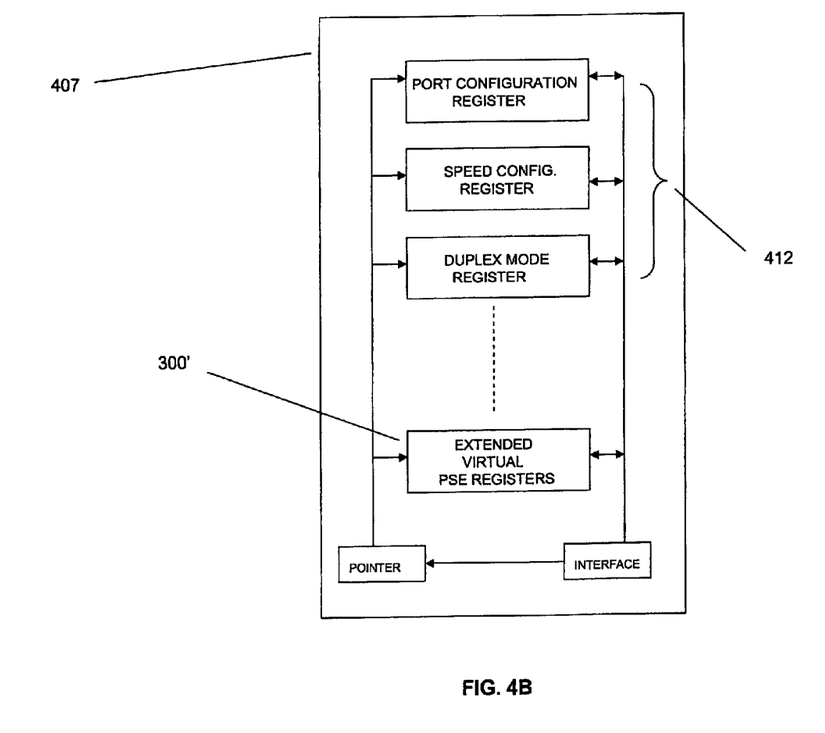
FIG. 4B is a more detailed block diagram of registers included within the PHY portion of the PoE system shown in FIG. 4A.

FIG. 4B is a more detailed block diagram of the PHY registers 407 shown in FIG. 4A. In FIG. 4B, specific types of PHY registers 407 are shown for purposes of illustration. For example, the PHY registers 407 can include a sub-group 412 that are configured for control of ports, speed, and other features, such as duplex mode availability. The registers 407 also include, however, an extended register set 300'.

The extended register set 300' is a virtual copy of the PSE controller registers 300 of FIG. 4A. That is, in the present invention, once a user has created operational software for storage within the PSE controller registers 300, this software can be virtually copied into the extended register set 300' within the PHY registers 407. The registers 300 within the PSE controller 210 are not eliminated. Instead, their contents are virtually copied into the extended register set 300'. This virtual copying eliminates to need to separately program registers within the PHY 202 and registers within the PSE controller 218.

Figure 5:
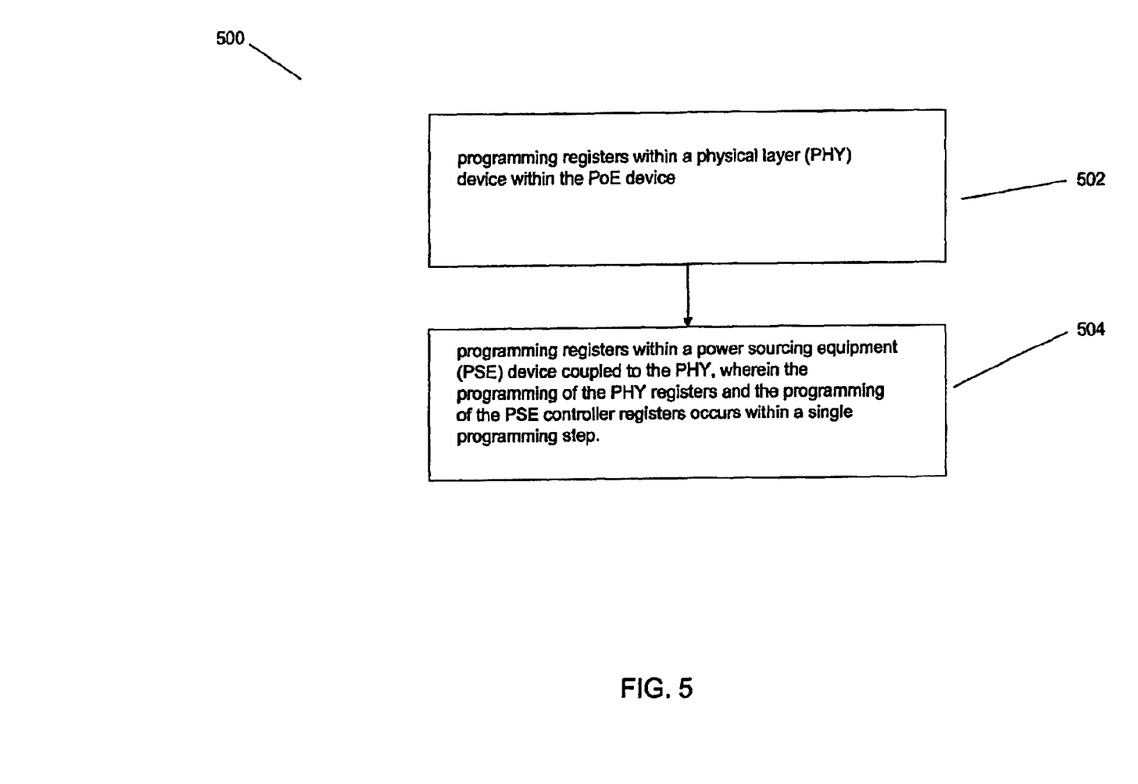
FIG. 5 is an exemplary flowchart of a method of practicing an embodiment of the present invention.

FIG. 5 is an exemplary flowchart of a method 500 that provides software programming to modules within a POE in accordance with an embodiment of the present invention. In FIG. 5, registers within a PHY device associated with the PoE are programmed in step 502. In step 504, registers within a PSE controller device are programmed, wherein the programming of the PHY registers and the programming of the PSE controller registers occurs within a single programming step.

Figure 6:
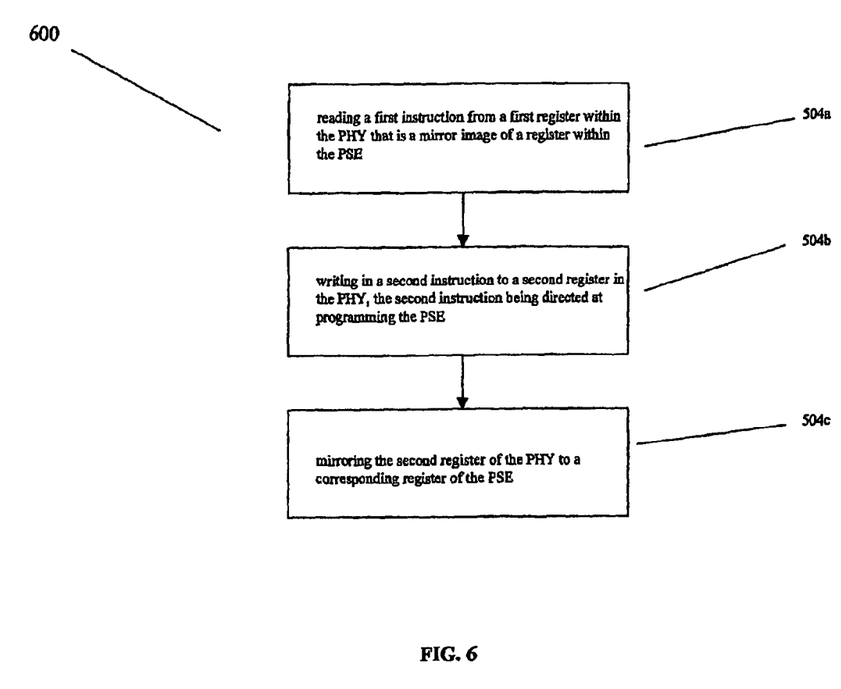
FIG. 6 is an exemplary flowchart expanding step 504 illustrated in FIG. 5.

FIG. 6 is an exemplary flowchart 600 expanding the step 504 illustrated in FIG. 5. In FIG. 6, the programming step 504 includes reading a first instruction from a first register within the PHY that is a mirror image of a register within the PSE, as indicated in step 504*a* including. Next, a step 504*b* includes writing in a second instruction to a second register in the PHY, the second instruction being directed at programming the PSE. Finally in step 504*c*, the second register of the PHY is mirrored to a corresponding register of the PSE.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A first Power over Ethernet (PoE) device, comprising:
   a PoE controller, including a first number of PoE control registers, configured to control a transfer of power between the first PoE device and a second PoE device over a communication link;

a physical layer device (PHY), including a second number of PoE control registers, configured to communicate data between the first PoE device and the second PoE device over the communication link, the second number of PoE control registers corresponding to the first number of PoE control registers; and an electrical isolator, coupled to the PHY, configured to enable the first number of PoE control registers to be substantially simultaneously programmed with contents of corresponding registers within the second number of PoE control registers when the second number of PoE control registers are programmed.

2. The first PoE device of claim 1, wherein contents within the first number of PoE control registers are extensions of the contents of the corresponding registers within the second number of PoE control registers.

3. The first PoE device of claim 1, wherein the content of the corresponding registers within the second number of PoE control registers are replicated within corresponding registers within the first number of PoE control registers.

4. The first PoE device of claim 1, wherein the PoE controller, the PHY, and the electrical isolator are implemented as part of a power sourcing equipment (PSE) device or a powered device (PD).

5. A method for providing software programming to modules within a first Power over Ethernet (PoE) device, the method comprising:

programming first registers within a physical layer device (PHY) within the PoE device, programming substantially simultaneously with the programming of the PHY registers, via an electrical isolator, corresponding second registers within the first PoE device; and upon programming the corresponding second registers, controlling a transfer of power between the first PoE device a second PoE device over a communication link and communicating data between the first PoE device and the second PoE device over the communication link.

6. A first Power over Ethernet (PoE) device, comprising:

a PoE controller, including a first number of PoE control registers, configured to control a transfer of power between the first PoE device and a second PoE device over a communication link;

a switch chip, including a second number of PoE control registers, configured to couple to a software host; and an electrical isolator, coupled to the switch chip and the PoE controller, configured to substantially simultaneously reflect contents of the second number of PoE control registers to corresponding ones of the first number of PoE control registers to allow the software host to control the PoE controller by accessing the second number of PoE control registers without accessing the first number of PoE control registers directly.

7. The first PoE device of claim 6, wherein contents of the first number of PoE control registers are extensions of the contents of the second number of PoE control registers.

8. The first PoE device of claim 6, wherein the contents of the second number of PoE control registers are replicated within the first number of PoE control registers.

9. The first PoE device of claim 6, wherein the PoE controller, the switch chip, and the electrical isolator are implemented as part of a power sourcing equipment (PSE) device or a powered device (PD).

10. A first Power over Ethernet (PoE) device, comprising:

a physical layer device (PHY) including a first number of PoE control registers, a first group of control registers within the first number of PoE control registers being associated with a second number of PoE control registers, the PHY being configured to communicate data between the first PoE device and a second PoE device over a communication link; and a PoE controller, including the second number of PoE control registers, configured to control a transfer of power between the first PoE device and the second PoE device over the communication link;

an electrical isolator configured to couple the first number of PoE control registers and the second number of PoE control registers, wherein contents to be programmed within the second number of PoE control registers is programmed into the first group of control registers and copied from the first group of control registers to the second number of PoE control registers.

11. The PoE device of claim 10, wherein contents copied to the second number of PoE control registers are extensions of contents of the first group of control registers.

12. The PoE device of claim 10, wherein contents copied to the second number of PoE control registers are replicas of contents within the first group of control registers.

13. The PoE device of claim 10, wherein a second group of control registers within the first number of PoE control registers is not associated with the second number of PoE control registers.

* * * * *